United States Patent [19]

Kitano et al.

[11] Patent Number: 4,852,711

[45] Date of Patent: Aug. 1, 1989

[54] CLUTCH DISC

[75] Inventors: Seiichi Kitano, Shijonawate; Toshiki Yamaguchi, Takatuki, both of Japan

[73] Assignee: Kabushiki Kaisha Daikin Seisakusho, Osaka, Japan

[21] Appl. No.: 168,130

[22] PCT Filed: Jul. 6, 1987

[86] PCT No.: PCT/JP87/00474

§ 371 Date: Feb. 19, 1988

§ 102(e) Date: Feb. 19, 1988

[87] PCT Pub. No.: WO88/00659

PCT Pub. Date: Jan. 28, 1988

[30] Foreign Application Priority Data

Jul. 10, 1986 [JP] Japan .................. 61-106258[U]

[51] Int. Cl.⁴ .................. F16D 13/46; F16D 13/64
[52] U.S. Cl. .................. 192/107 C
[58] Field of Search .................. 192/107 C

[56] References Cited

U.S. PATENT DOCUMENTS

| 2,038,016 | 4/1936 | Wemp | 192/107 C |
| 2,182,999 | 12/1939 | Wolfram | 192/107 C |
| 2,392,246 | 1/1946 | Katcher | 192/107 C |
| 2,534,991 | 12/1950 | Reed | 192/107 C |
| 2,541,296 | 2/1951 | Saks | 192/107 C |
| 3,624,770 | 11/1971 | Fujita et al. | 192/107 C |
| 4,546,866 | 10/1985 | Kamio | 192/107 C |

FOREIGN PATENT DOCUMENTS

| 45-31950 | 12/1970 | Japan . | |
| 48-43305 | 12/1973 | Japan . | |
| 536163 | 5/1941 | United Kingdom | 192/107 C |
| 1465913 | 3/1977 | United Kingdom | 192/107 C |

Primary Examiner—Dwight G. Diehl
Assistant Examiner—Andrea Pitts
Attorney, Agent, or Firm—Armstrong, Nikaido, Marmelstein, Kubovcik & Murray

[57] ABSTRACT

A clutch disc having a pair of side plates connected together by a stop pin and a cushioning plate inclined in relation to one side plate. A stepped coined section is formed on a stop pin fitting part of the side plate to which the cushioning plate is fastened. The stop pin does not interfere with the press work and the outer peripheral part of the side plate can be formed into a conical shape.

4 Claims, 3 Drawing Sheets

CLUTCH DISC

DESCRIPTION

1. Technical Field

This invention relates to a clutch disc wherein a cushioning plate is so installed as to be inclined relatively to a side plate.

2. Background Art

In a conventional clutch disc, cushioning plates 102 are secured to an outer peripheral part of a side plate 100 with spaces left therebetween in a circumferential direction and stop pins 104 are disposed between fastening portions of the cushioning plates 102, as illustrated in FIG. 6.

Therefore, in case when the outer peripheral part of the side plate 100 is bent into a conical surface, i.e. subjected to a so-called conical press work, to have the cushioning plate 102 incline relatively to the side plate 100; the stop pin 104 becomes a hinderance to the conical press work so that the stop pin 104 must be moved to a radially inside position as illustrated by a circle of two-dot chain line of FIG. 6.

An object of this invention is to provide a clutch disc, in which the stop pin can be disposed at the outer peripheral part of the side plate even when the outer peripheral part of the side plate is subjected to the conical press work.

DISCLOSURE OF INVENTION

This invention relates to a clutch disc wherein a disc-like hub flange extending in a radially outer peripheral direction of a spline hub is installed, a circumferentially divided cushioning plate is fastened to a radial outside of one side plate among side plates sandwiching the hub flange, friction facings are secured to the cushioning plate, and a stop pin circumferentially connecting the both side plates is installed between cushioning plate fastening portions of said one side plate; characterized by that a stepped coined section is formed at a stop pin fitting part of the side plate, an outer peripheral part of the side plate to which the cushioning plate is fastened is formed into a conical shape, and the cushioning plate is inclined in relation to the side plate. The stepped coined section is formed at the stop pin fitting part of the side plate so that the stop pin does not become hindrance to the conical press work of the outer peripheral part of the side plate. Namely, the stepped conical section is formed at the stop pin fitting part of the side plate, the outer peripheral part of the side plate to which the cushioning plate is fastened is formed into the conical shape, and the cushioning plate is inclined in relation to the side plate; so that a clearance is provided between an outer peripheral surface of the stop pin and an end face of the coined section and an interference between the end face and the stop pin can be avoided even when the outer peripheral part of the side plate is subjected to the so-called conical press work within a specified range.

Consequently, it becomes unnecessary to move the stop pin to the radially inside position as in the conventional case of FIG. 6 and an allowance for design of the entire clutch disc can be widened.

BRIEF DESCRIPTION OF DRAWINGS FIG. 1 is a vertical sectional view of a clutch disc according to the invention.

MODE FOR CARRYING OUT THE INVENTION

The invention will be better understood from the following description taken in connection with the accompanying drawings.

Figure 1:
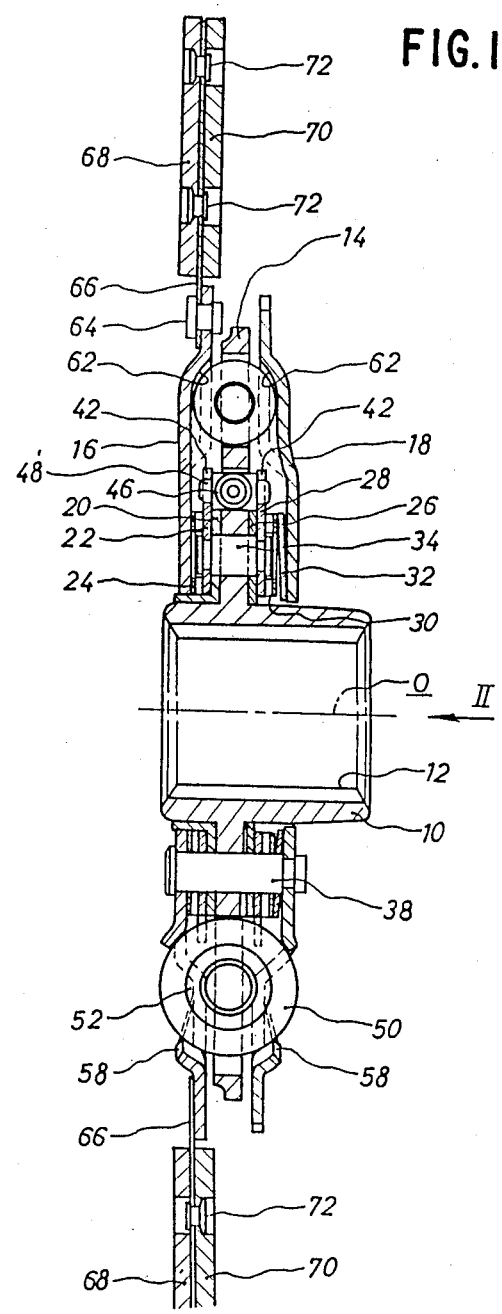

In FIG. 1 (taken on a line I—I of FIG. 2) showing the vertical sectional view of the two-stage hysteresis type clutch disc according to the present invention, 10 is a spline hub. Spline internal tooth 12 spline fitting onto an input shaft 0 of a transmission (not shown) is formed on an inner peripheral surface of the spline hub 10. A radially outwardly extending hub flange 14 is formed integrally on the spline hub 10, and a clutch plate 16 and a retaining plate 18 (both being a side plate) are disposed on both sides of the hub flange 14.

Between the hub flange 14 and the clutch plate 16, there disposed a bush 20, a sub plate 22 and a friction washer 24 (first friction member) in this order from the hub flange 14 side. Further, between the hub flange 14 and the retaining plate 18, there disposed a friction washer 26 (first friction member), a sub plate 28, a friction washer 30 (second friction member) and a coned disc spring 32 in this order from the hub flange 14 side.

Figure 2:
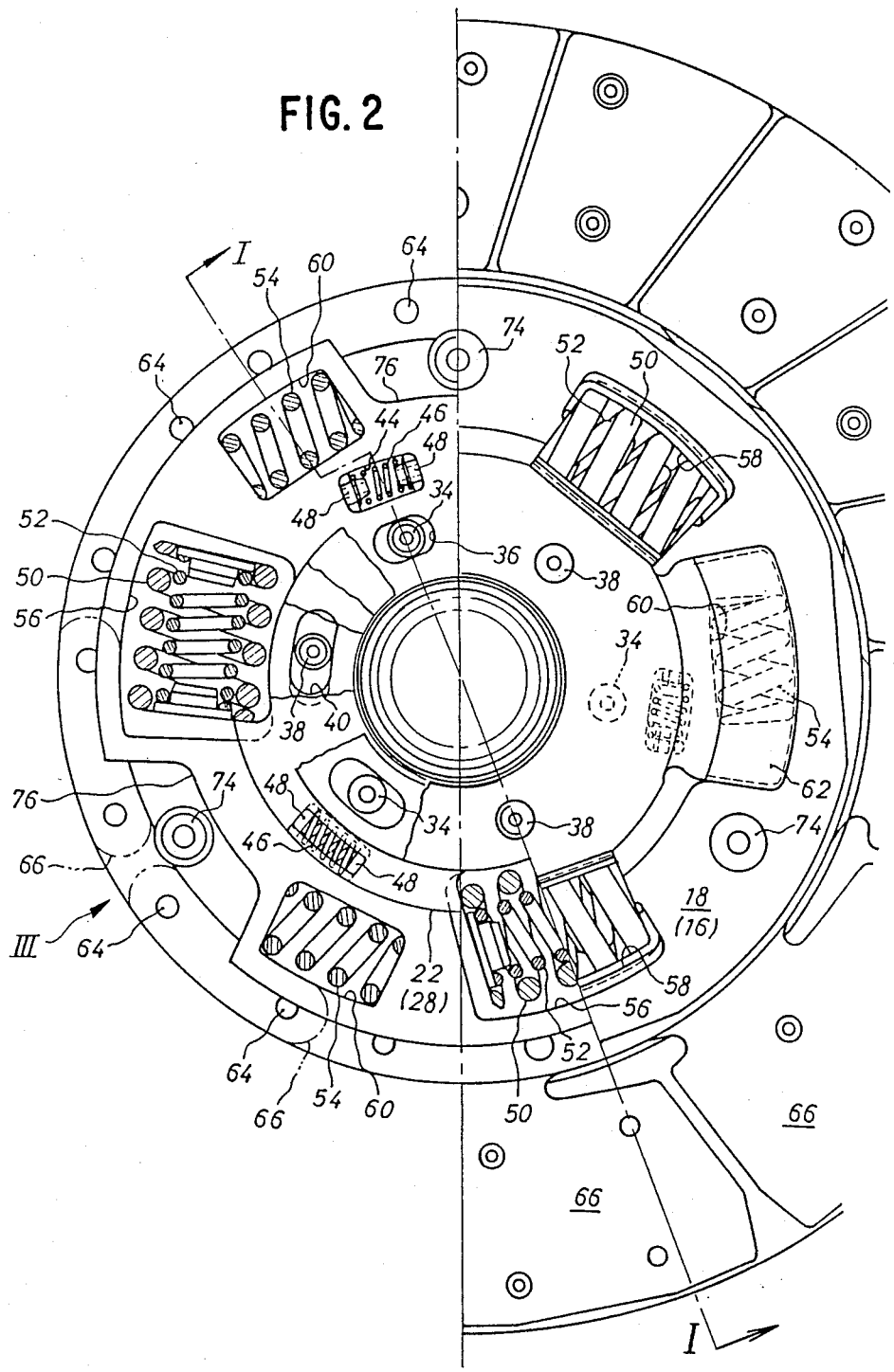
FIG. 2 is a view viewed in a direction of arrow II of FIG. 1.

The sub plate 22 and the sub plate 28 are pinched by a sub pin 34, and the sub pin 34 passes through a hole 36 (FIG. 2) of the hub flange 14. The sub pin 34 is disposed at three places with equal circumferential spaces left therebetween as illustrated by FIG. 2. Side pins 38 are disposed between the sub pins 34 with equal spaces left therebetween in the same manner, and the clutch plate 16 and the retaining plate 18 of FIG. 1 are pinched by the side pins 38. The side pins 38 pass through holes 40 of the hub flange 14 etc. (FIG. 2).

A return spring 46 for resetting initial state and having a comparatively weak spring force is compressively installed through seats 48 between notches 42 (FIG. 1) formed on outer peripheral parts of the sub plates 22 & 28 and a hole 44 (FIG. 2) of the hub flange 14. Further, a second-stage large torsion spring 50 and small torsion spring 52 and a third-stage torsion spring 54 are installed between the hub flange 14 and the clutch plate 16 and the retaining plate 18, in such a manner that they exert their spring forces within a predetermined range of torsion angle respectively.

The large torsion spring 50 and the small torsion spring 52 are disposed in a hole 56 (FIG. 2) of the hub flange 14 and holes 58 of the clutch plate 16 and the retaining plate 18, respectively. A torsion spring 54 is incorporated in a hole 60 (FIG. 2) of the hub flange 14 and swelled portions 62 of the clutch plate 16 and the retaining plate 18. These large torsion spring 50, small torsion spring 52 and torsion spring 54 are disposed at three places respectively with equal spaces left therebetween in the circumferential direction.

A cushioning plate 66 is fastened by a rivet 64 to an outer peripheral part of the clutch plate 16, and a friction facing 68 pressed on an engine flywheel (not shown) and a friction facing 70 pressed on a pressure plate (not shown) are fastened by a rivet 72 to both surfaces of the cushioning plate 66.

The cushioning plate 66 is divided into nine pieces in the circumferential direction as illustrated by FIG. 2. A stop pin 74 secured by a "crimp work" to the clutch plate 16 and the retaining plate 18 is disposed between the cushioning plates 66 adjoining each other.

The stop pin 74 fits in a notch 76 of the hub flange 14 and permits the hub flange 14, the clutch plate 16 and the retaining plate 18 to revolvingly move each other within a range of the notch 76. Under a state where the stop pin 74 presses on an end face of the notch 76, the stop pin 74 connects the hub flange 14 with the clutch plate 16 and the retaining plate 18 in the circumferential direction. The stop pin 74 and the notch 76 are disposed at three places respectively with equal spaces provided therebetween in the circumferential direction.

Figure 5:
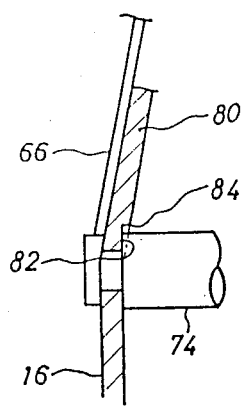
FIG. 5 is a view taken on a line V—V of FIG. 3.
Figure 3:
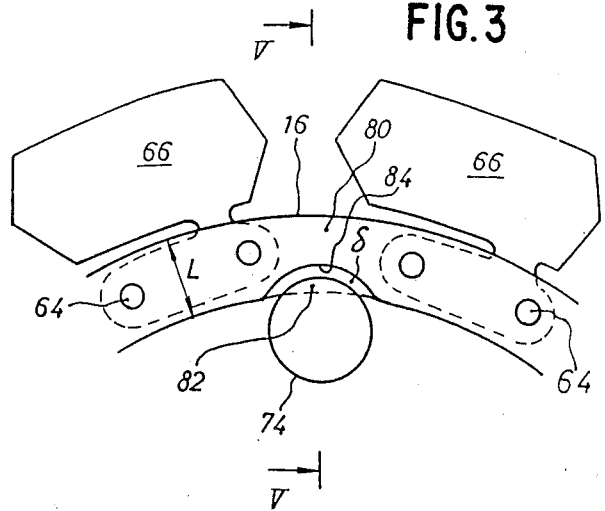
FIG. 3 is an enlarged view of a part III of FIG. 2.

As illustrated by FIG. 3 which is the enlarged view of the part III of FIG. 2, an outer peripheral L-portion of the clutch plate 16 is subjected to the so-called conical press work so as to form the conical surface. A conical portion 80 within a range of L is inclined toward said pressure plate with an extremely slight inclination angle (as small as 1°-3°) as shown by FIG. 5 so as to facilitate a return action of the pressure plate (not shown) at the time of clutch disengagement.

A stepped coined section 82 made by a press work, for example, is formed on a part where the conical portion 80 overlaps with the stop pin 74. A clearance δ (FIG. 3) is made between an end face 84 of the coined section 82 and an outer peripheral face of the stop pin 74 so that the stop pin 74 does not interfere with the conical section 80 even when the stop pin 74 is fitted in the conical section 80.

Function will be described hereunder. As illustrated in FIG. 3, even when the outer peripheral portion of the clutch plate 16 is subjected to the so-called conical press work within the range of L, the clearance δ is provided between the outer peripheral portion of the stop pin 74 and the end face 84 of the coined section 82 so that the end face 84 does not interfere with the stop pin 74.

Accordingly, it becomes unnecessary to dispose the stop pin 74 at a radial inside position of the clutch plate 16 as in the conventional case, and the allowance for design of the entire clutch disc can be widened even when the clutch plate 16 is subjected to the conical press work.

Figure 4:
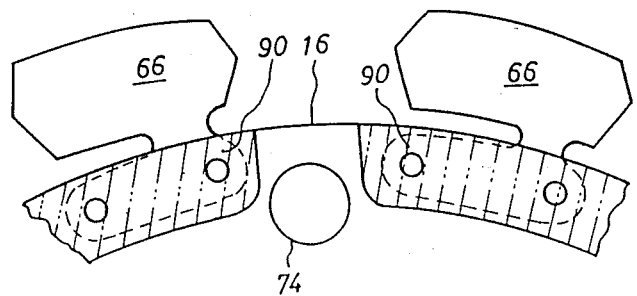
FIG. 4 is a schematic structural view showing another embodiment.
Figure 6:
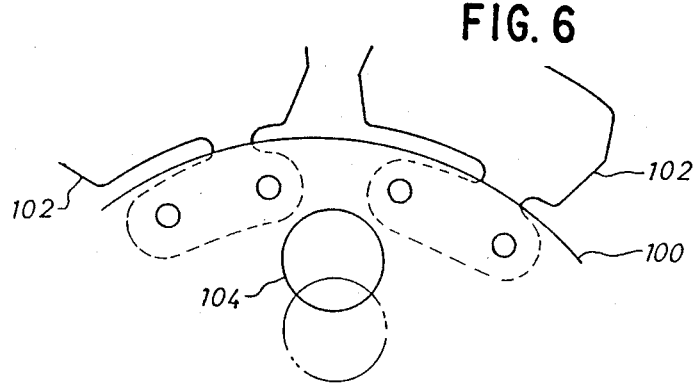
FIG. 6 is a schematic structural view showing a conventional embodiment.

The present invention is not limited to only one foregoing embodiment, for example, in which the outer peripheral portion of the clutch plate 16 is subjected to the conical press work over the entire circumference, but only a fitting portion 90 (shown by two-dot hatched lines) of the cushioning plate 66 may be subjected to the conical press work as illustrated by FIG. 4.

INDUSTRIAL APPLICABILITY

As described above, in the clutch disc according to the present invention having the inclined cushioning plate, the allowance for design of the entire clutch disc can be widened so that the clutch disc is useful especially it is adopted for various automobile clutches.

What is claimed is:

1. A clutch disc having a disc-like hub flange extending in a radially outer peripheral direction of a spline hub, side plates at the opposite sides of said hub flange, a circumferentially divided cushioning plate fastened to a radial outside of one of said side plates, friction facings secured to the opposite sides of said cushioning plate, and a stop pin circumferentially connecting said side plates at the cushioning plate fastening portions of said one of said side plates, a stepped coined section at the stop pin fitting part of said one of said side plates, an outer peripheral part of said one of said side plates to which said cushioning plate is fastened being formed into a conical shape, said cushioning plate being inclined relative to said one of said side plates.

2. A clutch disc as set forth in claim 1, in which the outer peripheral part of said one of said side plates to which said cushioning plate is fastened is formed into said conical shape over its entire circumference.

3. A clutch disc as set forth in claim 1, in which said outer peripheral part of said one of said side plates to which said cushioning plate is fastened is formed into said conical shape only at the part of said one of said plates fastened to said cushioning plate.

4. A clutch disc as set forth in claim 2 or claim 3, in which said outer peripheral part of said one of said side plates to which said cushioning plate is fastened is formed into said conical shape inclining toward the other of said side plates.

* * * * *